July 4, 1950 A. H. KIRKSEY 2,513,651
SERVICE LINE COUPLING
Filed Aug. 14, 1945 3 Sheets-Sheet 1
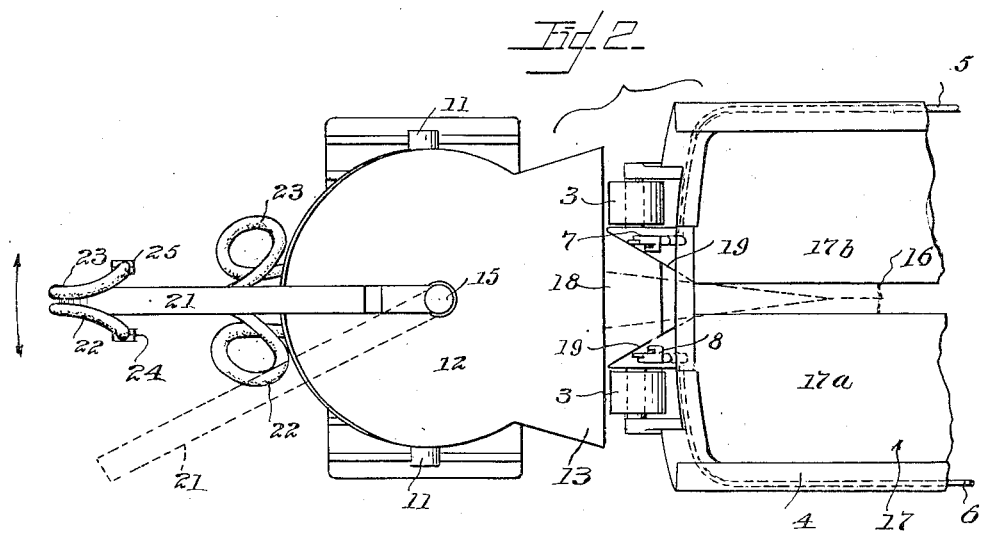
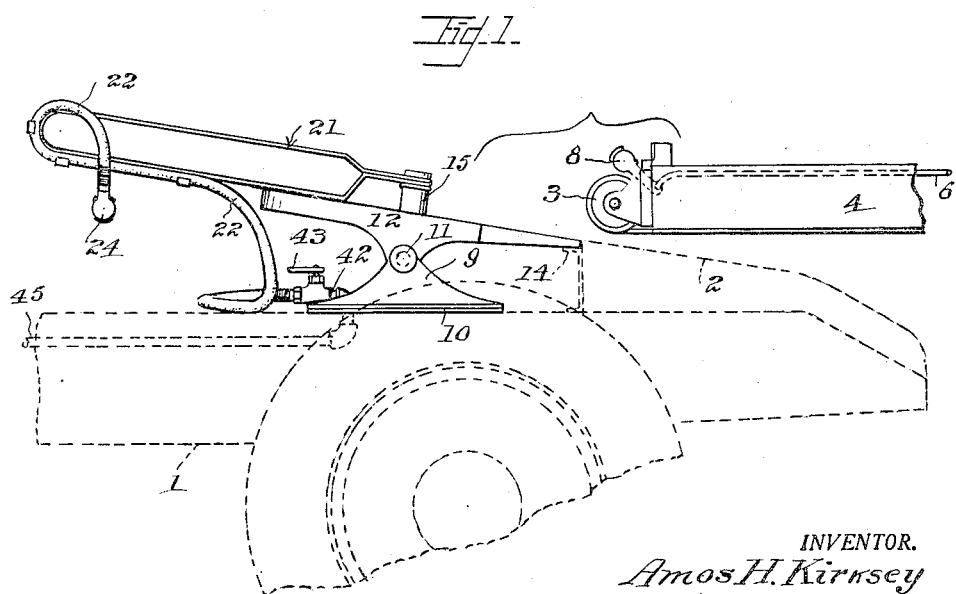
INVENTOR.
Amos H. Kirksey
BY Francis D. Ammen
Atty.

July 4, 1950          A. H. KIRKSEY          2,513,651
SERVICE LINE COUPLING
Filed Aug. 14, 1945          3 Sheets-Sheet 2
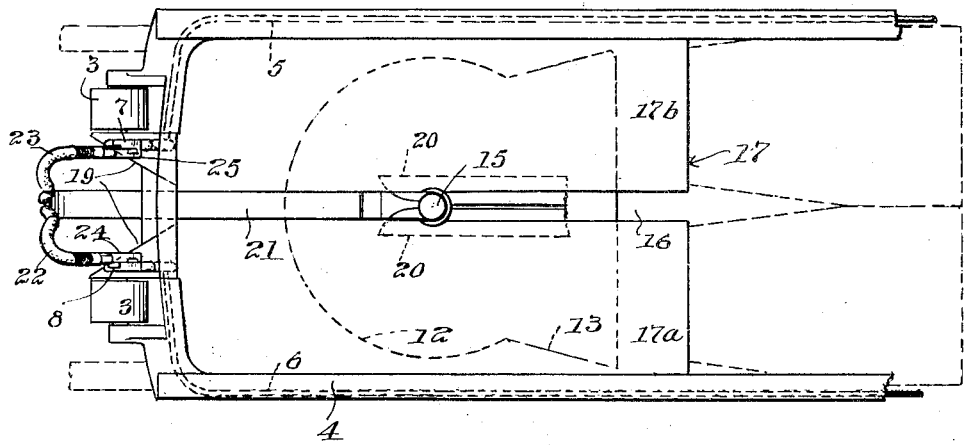
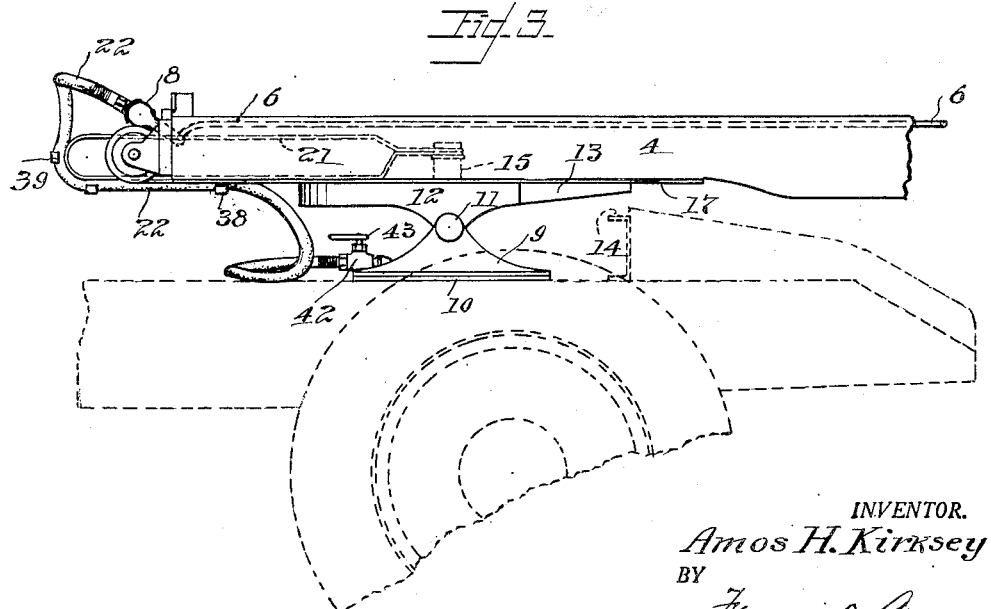
INVENTOR.
Amos H. Kirksey
BY
Francis D. Ammen
Atty.

July 4, 1950
A. H. KIRKSEY
2,513,651
SERVICE LINE COUPLING
Filed Aug. 14, 1945
3 Sheets-Sheet 3
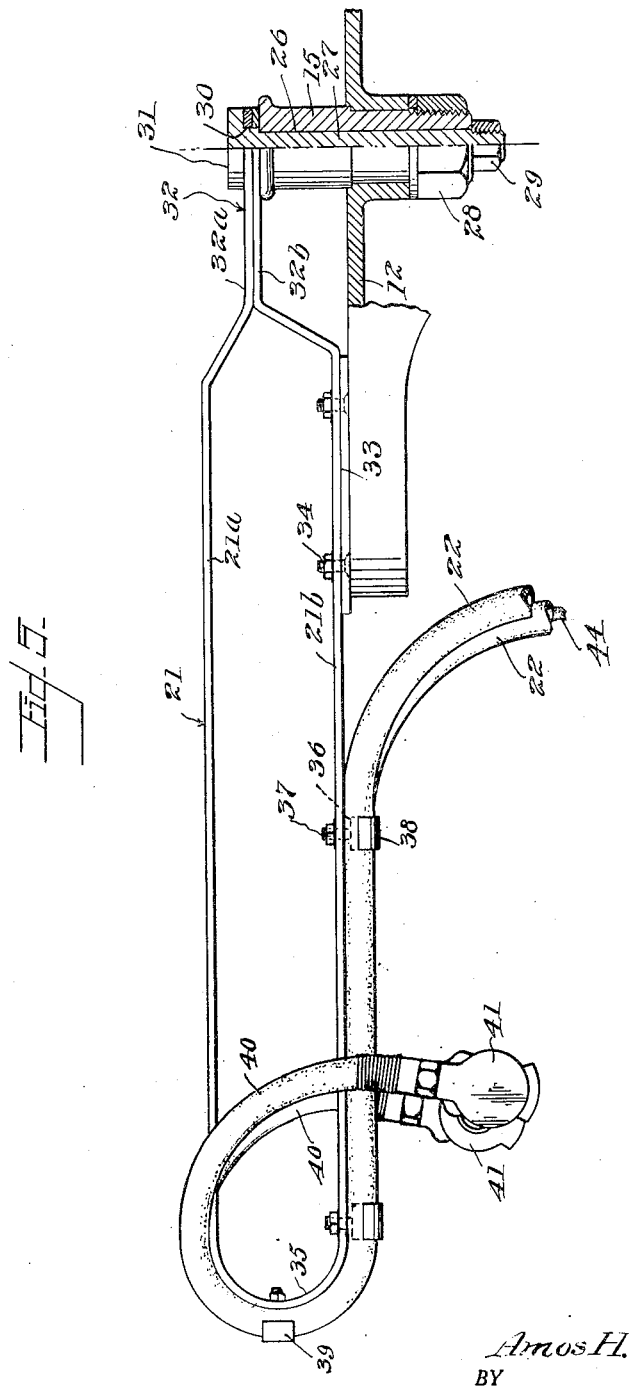
INVENTOR.
Amos H. Kirksey
BY
Francis D. Ammen
Atty.

Patented July 4, 1950

2,513,651

UNITED STATES PATENT OFFICE 2,513,651

SERVICE LINE COUPLING

Amos H. Kirksey, Los Angeles, Calif.

Application August 14, 1945, Serial No. 610,777

9 Claims. (Cl. 280—33.05)

This invention relates to a coupling apparatus for connecting up a supply line for an operating fluid on a towing vehicle, to the service line on a towed vehicle, for example, a trailer, or semi-trailer. The apparatus is intended to be used particularly for connecting up an operating fluid line such as pneumatic lines and hydraulic lines for operating brakes, or any accessory devices operating with a fluid of that kind; and also for connecting up electric light cables for supplying operating current to lights carried by the towed vehicle.

While the invention is applicable in other situations, it is described by way of example, in the following specification, applied for connecting up an operating fluid line and located in the vicinity of the draft coupling that connects a semi-trailer to the towing vehicle or truck. One of the objects of the invention is to provide simple means for supporting a flexible extension of the supply line in such a way that when the towing vehicle is coupled to the semi-trailer, the coupling member carried on the end of the flexible extension will be in convenient position for being interlocked by hand with a corresponding coupling member that may be carried in a fixed position on the towed vehicle.

The draft coupling connection for effecting the coupling of a towing vehicle to a semi-trailer usually includes a fifth-wheel element or member that is carried on the rear end of the towing vehicle, and this fifth-wheel member usually has a king pin associated with it. The towing vehicle is coupled at the draft coupling to the semi-trailer, by backing its rear end under the forward end of the semi-trailer. This is done while the fifth-wheel member of the towing vehicle is held in a tilted position so that it presents an inclined face up which the rollers on the forward end of the semi-trailer advance. When this relative movement is taking place, the guide throat on the semi-trailer engages the king pin and aligns the fifth-wheel member of the towing vehicle coaxially with the fifth-wheel member on the semi-trailer. One of the objects of this invention is to provide a construction for coupling apparatus, for connecting a supply line to a service line, referred to above, and which is particularly adapted for use with towing vehicles and semi-trailers that can be coupled together in the way just described.

Another object of the invention is to provide a mounting or support for carrying a flexible extension of a supply line, in a location adapting it for effecting an interlocking connection between its coupling heads, or coupling members and the relatively fixed coupling heads or coupling members carried on the forward end of a semi-trailer.

Another object of the invention is to provide a carrier for a flexible conduit extension of the supply line that can be applied as an attachment to a king pin on a towing vehicle, and which is very simple in construction and readily applicable to the king pin; also, to construct the carrier in such a way that it is very simple and inexpensive to manufacture.

Further objects of the invention will appear hereinafter.

The invention consists in the novel parts and combinations of parts to be described hereinafter, all of which contribute to produce an efficient coupling apparatus.

A preferred embodiment of the invention is described in the following specification, while the broad scope of the invention is pointed out in the appended claims.

In the drawing:

Fig. 1 is a side elevation of the rear end of a towing vehicle represented in dotted lines; and illustrating its fifth-wheel member held in a tilted position, as it would be, when the towing vehicle is being backed under the forward end of the semi-trailer. In this view a portion of the forward end of the semi-trailer is also illustrated broken away.

Figure 2 is a plan of the parts illustrated in Figure 1 and showing them in the same relation as in Figure 1.

Figure 3 is a side elevation corresponding to Figure 1 but showing the relation of the parts after the towing vehicle has been coupled to the semi-trailer through the draft coupler which enables the towing vehicle to tow the semi-trailer.

Figure 4 is a plan of the parts illustrated in Figure 3 and showing the flexible extension of the supply line connected up to the service line on the semi-trailer.

Figure 5 is a side elevation upon an enlarged scale, illustrating the teeter, or tilt member, of the fifth-wheel on the towing vehicle partially in section and broken away, and this view also illustrates how the carrier for the flexible conduit extension is constructed and attached to the king pin.

Referring to the drawings and particularly to Figures 1 and 2, 1 indicates, in dotted lines, the rear end of the towing vehicle which includes a ramp face 2 up which rollers 3 on the forward end 4 of the semi-trailer roll when the towing vehicle is backed under the same. The drawing illustrates two service lines 5 and 6 for carrying operating fluid rearwardly on the semi-trailer frame to bring it to the accessory devices such as brakes or lamps to be operated through the service lines.

These two service lines 5 and 6 may be of any suitable construction and they terminate forwardly at two fixed coupling heads 7 and 8, to which they are connected.

These coupling heads, as illustrated, face toward each other, that is to say, when they are coupled to the coupling heads on the towing vehicle, the towing vehicle's clamping head will be applied at the inside.

The construction on the towing vehicle 1 includes a pillow-block 9 mounted for rotation on the base 10 on a vertical axis, and this axis passes through a horizontal bearing 11 located at each side of the structure (see Figure 2), which bearing supports the teeter or tilt member 12. The rear end of this tilt member 12 is formed into a projecting wing 13, the lower edge of which, in the tilted position of this member, rests upon a ledge or a rest 14, as indicated in dotted lines in Figure 1. The tilt member 12 carries a king pin 15, which in the present instance projects upwardly from the upper face of the tilt member.

When the tilt member is in the inclined position illustrated in Figure 2, its upper face constitutes an extension of the ramp 2 and the wheels 3 pass freely onto its upper face when they leave the ramp.

Of course, the towing vehicle may not be perfectly aligned with the trailer when it backs under it.

In order to guide the king pin 15 onto the central axis of the semi-trailer and into a guide slot 16 formed in the frame plate 17, the forward end of the frame plate 17 is formed with a converging throat 18 presented between inclined edges 19 as shown. These edges are formed on the forward end of the two sections 17a and 17b that in the present instance constitute the frame plate 17 of the semi-trailer.

As the king pin 15 passes back into the slot 16 it is engaged automatically by a pair of jaws 20, indicated in dotted lines in Figure 4. These jaws engage the king pin on opposite sides and effect a mechanical coupling for towing the trailer.

In applying my invention to a towing vehicle and semi-trailer constructed substantially as described, I provide a carrier 21 in the form of an arm that is preferably attached to the tilting member 12 so that it is capable of cooperating with the flexible conduits 22 or 23 in such a way as to enable the coupling heads 24 or 25 to be seized in one's hand and interlocked to the coupling heads 7 and 8. In order to accomplish this, I prefer to attach the rear end of this carrier arm 21 directly on the king pin, and the detail of this connection is illustrated in Figure 5. This view illustrates the king pin as provided with a bore 26 in which I mount a carrier pivot pin 27, the body of which is in the form of a shank that projects below the nut 28 that secures the lower end of the king pin in position. This shank is threaded at its lower end to receive a retaining nut 29 that seats against the lower end of the king pin 15.

The upper end of the pivot 27 is formed with a neck 30 of slightly enlarged diameter, so that a shoulder is formed to seat on the upper face of the king pin 15. Above this point the pivot 27 is formed with an enlarged head 31 under which the shank 32 of the carrier 21 is secured. The shank is formed of two superimposed extensions 32a and 32b, that have aligned punched openings to make it fit rotatably on the neck 30. The shoulder on the lower end of the neck 30 prevents the shank 32 from being clamped tight by the nut 29 and insures freedom of swing of the carrier arm 21 at all times.

The carrier arm 21 is preferably formed of flat strap metal with the "flat" in a horizontal plane, and the shank extensions 32a and 32b are formed integrally respectively with an upper fork 21a and a lower fork 21b, the upper fork being offset upwardly from the shank 32, and the lower fork 21b being offset downwardly from the level of the shank.

The carrier arm is supported on the forward portion of the tilt member 12, and for this reason may be provided with a wear plate 33 that is attached to the under face of the lower fork 21b by rivets or bolts 34.

The forks 21a and 21b are integrally connected by an arcuate extension or bight 35, which is useful because the conduits 22 can be hung on the under side of the fork 21b by suitable double hangers. Each hanger has a plate 36 with an elevated middle portion carried on a suspending bolt 37 and has two hooks 38 projecting laterally from the same, and extending under each of the two flexible conduits.

Near the outer end of the fork 21b another hanger of this type is employed and I prefer also to use a similar hanger at 39 on the bight 35. This enables the flexible conduits to be supported so as to present loose hanging ends 30 to which their coupling heads 41 are attached.

The receiving end of each flexible connection 22 (if pneumatic or hydraulic) is attached to a valve 42, having an operating handle 43, and attached to a supply pipe line 45 (see Figure 1). In case of an electrical connection an electric coupling would be employed for anchoring the end of a cable, such as the cable 44 (see Figure 5), that would be carried in its flexible outer sheath.

When the truck or towing vehicle is backed under the forward end of the trailer, the arm 21, if the carrier arm should be in an off position, as indicated by the dotted lines in Figure 2, it will be engaged by the side edges of the converging throat 18 and as the king pin moves back into the slot 16, it will move with it. This "straightens out" the arm 21 and brings it into longitudinal alignment with the principal fore-and-aft axis of the trailer passing through the king pin.

Of course, after the truck has been coupled to the trailer by the traction coupler through the agency of the king pin 15, and the coupling heads 24 and 25 attached to their corresponding coupler heads on the trailer, whenever the trailer frame swings laterally on the king pin when the towing vehicle is turning around a curve, or turning a corner, the arm 21 carrying the flexible hose 22 will also swing about the axis of the king pin. For this reason there should be sufficient slack in the hose 22, which may include loops as illustrated in Figs. 1 and 2 to permit this freedom of swinging movement of the arm 21.

Many other embodiments of this invention may be resorted to without departing from the spirit of the invention.

I claim as my invention:

1. In a fluid coupling apparatus for coupling supply lines on a towing vehicle to a trailer coupled thereto, the combination of a pair of relatively fixed coupling members mounted adjacent the forward end of the trailer, with one located on one side of the fore-and-aft longitudinal axis of the trailer, and the other on its other side, conduits on the trailer connected respectively to said coupling members, a carrier pivotally mounted on the towing vehicle to swing on a substantially vertical axis located substantially on the fore-and-aft longitudinal axis of the towing vehicle, said carrier including a forwardly projecting arm, a pair of flexible fluid conduits supported on said arm having free ends, coupling members attached respectively to each free end for attachment to the aforesaid coupling members located respectively on the same side of the fore-and-aft longitudinal axis of the trailer, and means on the trailer for engaging the said carrier which the towing vehicle is backed into coupling position with respect to the trailer, operating to swing the arm into substantial alignment with the fore-and-aft longitudinal axis of the towing vehicle, thereby enabling the carrier arm to hold the coupling members that are attached to the free ends of the flexible conduits in a position to facilitate their attachment manually to the relatively fixed coupling members on the trailer.

2. A fluid coupling apparatus according to claim 1, including a king pin carried by the towing vehicle, and including a guide plate carried at the forward end of the trailer, with a guide throat therein to receive the king pin, and in which the carrier is pivotally mounted on the king pin, said guide throat cooperating with the carrier to align the same substantially on the fore-and-aft axis passing through the king pin when the towing vehicle is coupled to the trailer.

3. A fluid coupling apparatus according to claim 1, including a fifth-wheel member mounted on the rear of the towing vehicle to swing on a substantially horizontal axis extending transversely to the fore-and-aft axis of the towing vehicle, also including a king pin carried by the fifth-wheel member, and in which the carrier is pivotally mounted on the said fifth-wheel member to swing about its said axis; said carrier having a normal position in which it extends in a forward direction from the king pin.

4. A fluid coupling apparatus according to claim 1, including a fifth-wheel member mounted to tilt on a transverse horizontal axis at the rear of the towing vehicle, a king pin projecting upwardly on the said fifth-wheel member, the arm of said carrier being pivotally attached to the king pin, and resting on the said fifth-wheel member.

5. In a fluid coupling apparatus for coupling a supply line for operating fluid on a towing vehicle, to a trailer coupled thereto, the combination of a king pin carried at the rear of the towing vehicle, a carrier arm pivotally supported on the king pin for rotation on the axis thereof, said arm formed of strap metal, having a shank portion attached to the king pin and having an arcuate extension at the free end thereof; and a flexible fluid conduit attached and supported on the arm, extending outwardly along the same, and having its outer end portion supported on said arcuate extension with its extreme end hanging downwardly between the arcuate extension and the king pin; and a coupling member carried by the depending end of the flexible conduit.

6. In a fluid coupling apparatus for coupling a supply line of operating fluid on a towing vehicle, to a trailer coupled thereto, the combination of a fifth-wheel member carried by the towing vehicle, a king pin extending upwardly therefrom, a flexible fluid conduit for the towing vehicle, a carrier arm for the said flexible conduit pivotally attached for rotation on the axis of the king pin, and resting on the said fifth-wheel member, said arm having a shank at its rear end for attachment to the king pin, and having a downwardly offset extension below the level of said shank and resting on the said fifth-wheel member, said offset extension projecting forwardly from the said fifth-wheel member and having an arcuate extension extending upwardly at its forward end; and means for securing said flexible conduit to the underside of said first named extension and to the forward side of said arcuate extension so as to leave the end portion of said flexible conduit free and hanging downwardly; and a coupling member attached to the free end of said conduit.

7. In a fluid coupling apparatus for coupling a supply line of operating fluid on a towing vehicle, to a trailer coupled thereto, a bifurcated carrier arm for supporting a flexible conduit on the towing vehicle, said carrier arm formed of strap metal, having an upper fork and a lower fork spaced downwardly from the upper fork, the inner end of said arm having overlying shank elements offset from said forks to form an attaching shank for attachment to the king pin of the towing vehicle.

8. In a fluid coupling apparatus for coupling a supply line of operating fluid on a towing vehicle, to a trailer coupled thereto, the combination of a fifth-wheel tilt-member pivotally supported on the trailer to rock on a substantially horizontal axis, and having a king pin projecting upwardly therefrom, an arm pivotally attached to said king pin to swing about the same in a substantially horizontal direction, and projecting beyond the forward edge of said fifth wheel member, a fixed conduit carried by the towing vehicle, extending back toward the rear end of the same, a flexible conduit with a coupler head thereon, connected to the fixed conduit, a relatively fixed coupling member on the forward end of the trailer, said coupling members being constructed to be manually connected together, said flexible conduit being supported at its forward end on the projecting forward portion of said arm beyond the forward edge of said tilt-member.

9. In a fluid coupling apparatus for coupling a supply line of operating fluid on a towing vehicle having a coupling member, to a trailer coupled thereto for traction, the combination of a relatively fixed fluid coupling member mounted adjacent the forward end of the trailer, a king-pin carried by the towing vehicle, a carrier pivotally attached on said king-pin and including an arm extending forwardly from the king-pin, a flexible fluid conduit on the towing vehicle supported on the arm, having a free hanging end, a coupling member mounted on the said free end adapted to be manually connected to the aforesaid relatively fixed coupling member, a guide plate carried at the forward end of the trailer with a guide throat therein to receive the king-pin, said carrier having means to cooperate with said guide throat to align the said arm substantially on the fore-and-aft axis passing through the king-pin when the towing vehicle is coupled to the trailer.

AMOS H. KIRKSEY.

REFERENCES CITED

The following references are of record in the file of this patent:

UNITED STATES PATENTS

| Number | Name | Date |
|---|---|---|
| 1,973,610 | Connors | Sept. 11, 1934 |
| 2,119,460 | Gurton et al. | May 31, 1938 |